3,287,462
CERTAIN 10-BENZAZOLYLTHIO PHENOXARSINE
DERIVATIVES
Joseph E. Dunbar, Midland, Mich., assignor to The Dow
Chemical Company, Midland, Mich., a corporation of
Delaware
No Drawing. Filed June 3, 1965, Ser. No. 461,166
6 Claims. (Cl. 260—300)

The present invention is directed to new 10-(2-benzimidazolylthio)-, 10-(2-benzoxazolylthio)-, and 10-(2-benzothiazolylthio)-type-phenoxarsine derivatives. The new phenoxarsine compounds of the present invention have the formula

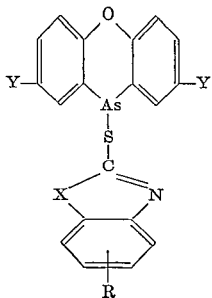

In this and succeeding formulae, each Y represents chloro, hydrogen or methyl, X represents oxygen, imino or sulfur and R repersents hydrogen, halo, alkyl, alkoxy, phenyl or substituted phenyl. As employed in the present specification and claims; halo represents chlorine, bromine and fluorine, and alkyl and alkoxy represent an alkyl or alkoxy group containing from 1 to 2, to 3, to 4 carbon atoms inclusive, such as methyl, ethyl, isopropyl, butyl, sec.-butyl, tert.-butyl, methoxy, ethoxy, n-propoxy and n-butoxy. In addition, substituted phenyl as employed in the present specification and claims repersents monohalophenyl, monoalkylphenyl and monoalkoxyphenyl. Such substituted phenyl groups include p-methylphenyl, o-chlorophenyl, p-bromophenyl, p-butylphenyl, o-ethoxyphenyl, m-methoxyphenyl, o-methoxyphenyl and p-isopropylphenyl. The compounds of the present invention are solids, which are moderately soluble in many organic solvents and of very low solubility in water. These new compounds are useful as pesticides for the control of various helminth, insect, arachnid, bacterial, fungal, fish and plant species. Representative pests include southern armyworms, lone star ticks, tapeworms, roundworms, wheat leaf rust, late blight, crabgrass, radish, cabomba and moneywort.

The compounds of the present invention are prepared by combining a 10,10'-oxybisphenoxarsine type compound having the formula

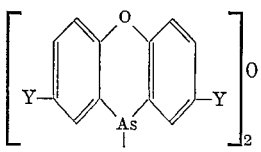

with a thiol compound having the formula

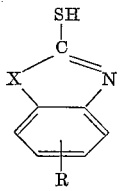

The reaction proceeds readily at temperatures between 50 150° C. and in the presence of an inert organic solvent as reaction medium.

The proportions of the starting materials to be employed are not critical, some of the desired product being formed when the reactants are combined in any proportions. However, the reaction consumes two moles of the thiol compound for every mole of 10,10-oxybisphenoxarsine, and the use of the reactants in such proportions is preferred. The use of a large excess of the thiol compounds will not hinder the reaction. However, the use of such large amounts of the thiol compound is not desirable for economic reasons. Representative inert organic solvents to be employed as reaction media include benzene, toluene, xylene, ethanol, methanol, methyl ethyl ketone and acetone. Representative substituted 10,10'oxybisphenoxarsines include 10,10'-oxybis(2-chlorophenoxarsine), 10,10'oxy-bis(2,8-dichlorophenoxarsine), 10,10'-oxybis(2,8-dimethylphenoxarsine).

In preparing the compounds of the present invention, the reactants and reaction media are contacted in any convenient order or fashion. Following the contacting of the reactants, the temperature of the reaction mixture is maintained within the reaction temperature range for a short period of time. Following the reaction period, the desired product can be separated and collected by conventional procedures such as crystallization and decentation or filtration. The new phenoxarsine compounds thus isolated can be employed in pesticidal applications or further purified by conventional procedures such as washing and recrystallization before so employed.

Representative thiol compounds to be employed as starting materials include the 2-benzoxazolethiols, the 2-mercaptobenzothiazoles and the 2-benzimidazolethiols such as 4-methyl-2-benzoxazolethiol,
6-methoxy-2-benzoxazolethiol,
7-ethoxy-2-benzoxazolethiol,
5-propoxy-2-benzoxazolethiol,
5-isopropyl-2-benzoxazolethiol,
6-fluoro-2-benzoxazolethiol,
5-bromo-2-benzoxazolethiol,
7-chloro-2-benzoxazolethiol,
6-methyl-2-benzoxazolethiol,
5-fluoro-2-mercaptobenzothiazole,
6-methoxy-2-mercaptobenzothiozole,
6-n-butoxy-2-mercaptobenzothiazole,
5-(4-ethylphenyl)-2-mercaptobenzothiazole,
5-isopropyl-2-mercaptobenzothiazole,
7-methyl-2-mercaptobenzothiazole,
6-methoxy-2-benzimidazolethiol,
7-ethoxy-2-benzimidazolethiol,
6-phenyl-2-benzimidazolethiol,
5-bromo-2-benzimidazolethiol,
4-n-butyl-2-benzimidazolethiol, 6-(4-methoxyphenyl)-2-benzimidazolethiol,
7-phenyl-2-benzoxazolethiol,
5-(3-ethylphenyl)-2-benzoxazolethiol,
6-isopropoxy-2-mercaptobenzothiazole,
4-(2-chlorophenyl)-2-mercaptobenzothiazole and
5-phenyl-2-benzimidazolethiol.

The following examples are merely illustrative and are not intended to be binding.

*Example 1.*—10-(2-benzoxazolylthio)phenoxarsine

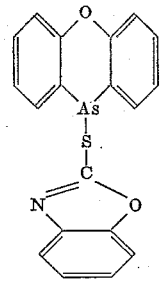

A warm solution of 2-benzoxazolethiol (9.05 grams; 0.060 mole) in 450 milliliters of benzene was combined with stirring with a warm solution of 10,10'-oxybisphenoxarsine (15.1 grams; 0.0300 mole) in 250 milliliters of benzene. Stirring was thereafter continued and the reaction heated at the boiling temperature under reflux for 45 minutes. Following the heating period, the benzene was removed by aspiration leaving a gummy residue which crystallized upon standing. The crystals and gummy residue were then dissolved in hot nitromethane and the hot solution decolorized with activated charcoal. The decolorized solution was allowed to cool, whereupon the 10-(2-benzoxazolylthio)phenoxarsine product precipitated as a crystalline solid. The crystalline 10-(2-benzoxazolylthio)phenoxarsine product melted at 114–115° C. and had carbon, hydrogen and sulfur contents of 58.16 percent, 2.96 percent, and 8.17 percent, respectively, as compared with to the theoretical contents of 58.02 percent, 3.08 percent, and 8.15 percent, respectively.

*Example 2.*—10-(2-benzothiazolylthio)phenoxarsine

A suspension of 2-mercaptobenzothiazole (20.1 grams; 0.120 mole) in 250 milliliters of benzene was added with stirring to a warm solution of 10,10'-oxybisphenoxarsine (30.1 grams; 0.0600 mole) in 500 milliliters of benzene. Thereafter stirring was continued and the reaction mixture heated at the boiling temperature and under reflux for one hour. Following the reaction period, the reaction mixture was processed exactly as described in Example 1 to obtain the 10-(2-benzothiazolylthio)phenoxarsine product as a crystalline solid melting at 169–176° C. Infrared analysis confirmed the identity of the product.

*Example 3.*—10-(2-benzimidazolylthio)phenoxarsine

A suspension of 2-benzimidazolethiol (18.1 grams; 0.120 mole) in 150 milliliters of benzene was added with stirring to a solution of 10,10'-oxybisphenoxarsine (30.1 grams; 0.060 mole) in 500 milliliters of benzene. Following the contacting of the reactants, stirring was continued and the reaction mixture heated at the boiling temperature and under reflux for nine hours. Thereafter, the reaction mixture was allowed to cool to room temperature. During the cooling period, the 10-(2-benzimidazolylthio)phenoxarsine product precipitated as a crystalline solid. This crystalline solid product was then collected by filtration and washed with benzene. The crystalline 10-(2-benzimidazolylthio)phenoxarsine product melted at 211–212° C. and had carbon and hydrogen contents of 58.74 percent and 3.98 percent, respectively, as compared to the theoretical contents of 58.17 percent and 3.34 percent, respectively.

In a similar manner the following compounds of the present invention are prepared.

10-(5-ethoxy-2-benzoxazolylthio)phenoxarsine (molecular weight 437) by reacting together 5-ethoxy-2-benzoxazolethiol and 10,10'-oxybisphenoxarsine.

10-(6-chloro-2-benzoxazolylthio)phenoxarsine (molecular weight 427) by reacting together 6-chloro-2-benzoxazolethiol and 10,10'-oxybisphenoxarsine.

10-(5-isopropyl-2-benzoxazolylthio)phenoxarsine (molecular weight 435) by reacting together 5-isopropyl-2-benzoxazolethiol and 10,10'-oxybisphenoxarsine.

2,8-dichloro-10-[5-(2-methylphenyl) - 2 - benzoxazolythio]phenoxarsine (molecular weight 551) by reacting together 5-(2-methylphenyl)-2-benzoxazolethiol and 10,10'-oxybis(2,8-dichlorophenoxarsine).

10-[7 - (4 - chlorophenyl-2-benzothiazolylthio)phenoxarsine] (molecular weight 519) by reacting together 4-methylphenyl-2-mercaptobenzothiazole and 10,10'-oxybisphenoxarsine.

2 - methyl - 10 - (6 - ethoxy - 2 - benzothiazolylthio)phenoxarsine (molecular weight 467) by reacting together 6-ethoxy-2-mercaptobenzothiazole and 10,10'-oxybis-(2-methylphenoxarsine).

10 - (7 - methyl - 2 - benzothiazolylthio)phenoxarsine (molecular weight 423) by reacting together 7-methyl-2-mercaptobenzothiazole and 10,10'-oxybisphenoxarsine.

10 - [7 - phenyl - 2 - benzothiazolylthio]phenoxarsine (molecular weight 487) by reacting together 7-phenyl-2-mercaptobenzothiazole and 10,10'-oxybisphenoxarsine.

10 - (5 - bromo - 2 - benzimidazolylthio)phenoxarsine (molecular weight 471) by reacting together 5-bromo-2-benzimidazolethiol and 10,10'-oxybisphenoxarsine.

2,8 - dimethyl - 10 - (7 - ethoxy - 2 - benzimidazolylthio)phenoxarsine (molecular weight 464) by reacting together 7-ethoxy-2-benzimidazolethiol and 10,10'-oxybis-(2,8-dimethylphenoxarsine).

10 - (5 - chloro - 2 - benzimidazolylthio)phenoxarsine (molecular weight 426) by reacting together 5-chloro-2-benzimidazolethiol and 10,10'-oxybisphenoxarsine.

10 - [7 - (4 - bromophenyl) - 2 - benzimidazolylthio] phenoxarsine (molecular weight 547) by reacting together 7-(4-bromophenyl)-2-benzimidazolethiol and 10,10'-oxybisphenoxarsine.

10 - [4 - (4 - ethylphenyl) - 2 - benzimidazolylthio] phenoxarsine (molecular weight 496) by reacting together 4-(4-ethylphenyl)-2-benzimidazolethiol and 10,10'-oxybisphenoxarsine.

The compounds of the present invention or compositions containing the same, can be applied to pests and their habitats and food in parasiticidal amounts to obtain excellent controls and kills of many organisms. In further operations, the compounds or formulations containing the same can be applied to the soil for the control of soil fungi and bacteria. Also, the compounds can be employed as slimicides in the white water in paper mills or the water employed in cooling towers. Additionally, the compounds can be included in inks, adhesives, soaps, asphalt, plastics, vinyl tile, cutting oils, or oil or latex paints to prevent mold and mildew, and the degradation of such products resulting from microbial attack. In still further operations the compounds of the present invention can be employed as an anti-fouling agent in marine paints. In other operations, the compounds can be distributed in textiles or cellulosic materials, or can be employed in the impregnation of wood and lumber to preserve and protect such products from the attack of the fungal agents of rot, mold, mildew and decay.

The compounds conveniently can be employed in liquid or dust compositions. In such usage, the compounds are modified with one or a plurality of adjuvants or helpers including water, organic solvents, petroleum oils, petroleum distillates, napthas, or other liquid carriers, surface active dispersing agents and finely divided solids such as chalk, talc or bentonite. Depending upon the concentration of the parasiticide compounds in such formulations, the augmented compositions are adapted to be distributed on plants or plant parts, or in soil, inks, adhesives, cutting oils, paints, textiles, paper, lumber, white or cooling waters, or to be employed as concentrates and subsequently diluted with additional liquid or solid adjuvants to produce the ultimate treating compositions. The toxicant compounds of the present invention and the compositions containing these compounds are introduced into the various environments by such conventional techniques as spraying, dusting, drenching, and plowing into the soil.

The exact concentration of the novel compounds to be employed in the treating compositions is not critical and may vary considerably provided the required amount of effective agent is supplied on the plant or plant part in the soil, ink, adhesive, cutting oil, textile, paper, wood and so forth. The concentration of toxicant in liquid compositions generally is from about 0.0005 to 50 percent by weight. Concentrations up to 95 percent by weight oftentimes are conveniently employed. In dusts, the concentration of the toxicant can be from about 0.005 to 10 percent by weight. In compositions to be employed as concentrates, the toxicant can be present in a concentration of from 5 to 98 percent by weight.

In operations against soil dwelling pests such as soil fungi and bacteria the compounds of the present invention are effective in the killing of such organisms at concentrations of 200 parts per million by weight of soil. When employed as the active constituent against bacterial and fungal diseases of plants such as late blight and wheat leaf rust the compounds are effective at concentrations of 500 parts per million by weight. In other operations, the compounds of the present invention are effective in preventing the microbial degradation of wood when the wood is impregnated with liquid compositions containing the toxic compounds of this invention at concentrations of 10,000 parts per million by weight. In addition, the compounds of the present invention are useful for the control of terrestial plants when employed at concentrations of 100 pounds per acre. In further operations, the compounds of the present invention are effective as aquatic herbicides when employed in the plants aqueous environment at concentrations of 50 parts per million by weight. In still further operations, the compounds of the present invention are employed in paints, cutting oils, white or cooling waters, casein suspensions or adhesives at a concentration of at least 1500 parts per million by weight to achieve kill and control of fungi and bacteria which cause microbiological degradation of these products.

10-(2-benzoxazolylthio)phenoxarsine and 10-(2-benzimidazolylthio)phenoxarsine give complete kills of southern armyworm, bacterium fire blight, tomato early blight, Bacillus cereus and fungus brown rot and American cockroach when employed in compositions containing the compound at concentrations of 800 parts per million. In additional operations 10-(2 - benzoxazolylthio)phenoxarsine and 10-(2-benzimidazolylthio)phenoxarsine give complete kills of the aquatic plants elodea, cambomba, moneywort and salvinia when the compound is put in the plants' aqueous environment at a concentration of 100 parts per million by weight. In additional operations, 10-(2-benzimidazolylthio)phenoxarsine and 10-(2-benzoxazolylthio) phenoxarsine give complete kills of radish, sorgum milo, and Japanese millet when the compound was employed in aqueous compositions at a concentration of 100 pounds per acre.

The present application is directed to and concerned with the disclosure and claiming of the inventions as described hereinbefore. The present application is also directed to the disclosure and claiming of the inventions in compounds as are defined by any subgeneric group or class of 10-(2-benzimidazolylthio)-, 10-(2-benzoxazolylthio)- and 10-(benzothiazolylthio)-type of phenoxarsine compounds which may be obtained by any permutation or combination of the alternative expressions in the several compound definitions to be found hereinbefore.

The 2-benzimidazolethiol compounds employed as starting materials in the present invention are prepared by known methods wherein a substituted 2-phenylenediamine compound having the formula

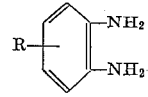

is reacted with potassium ethyl xanthate in the presence of ethanol and water. The reaction mixture is heated at reflux for a short period of time. The mixture is then decolorized with activated charcoal and the decolorized mixture treated with acetic acid. Thereafter the reaction mixture is cooled to initiate the crystallization of the 2-benzimidazolethiol compound which is then collected by filtration.

The 2-benzoxazolethiol compounds employed as starting materials in the present invention are prepared by the same method as used to prepare the 2-benzimidazolethiol compound. Potassium ethyl xanthate is reacted with an o-aminophenol compound having the formula

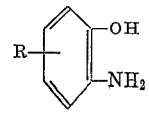

The 2 - mercaptobenzothiazole compounds employed herein as starting materials are prepared by known methods. In a representative method an o-chloronitriobenzene compound corresponding to the formula

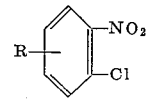

is reacted with an aqueous solution of NaHS and a solution of hydrogen sulfide saturated with carbon disulfide. The reaction mixture is diluted with water and allowed to stand at room temperature for several hours. Thereafter the reaction mixture is filtered to remove any solid byproducts and the reaction mixture treated with dilute sulfuric acid to precipitate the crude product. The crude product is then dissolved in aqueous ammonia and precipitated from the ammonia solution by the addition of dilute sulfuric or hydrochloric acid. The solid 2-mercaptobenzothiazole compound is then collected by conventional procedures.

The 10,10'-oxybisphenoxarsine type compounds employed as starting materials are prepared by known methods wherein a substituted diphenyl ether compound having the formula

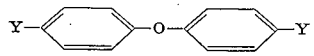

is refluxed with arsenic trichloride and anhydrous aluminum chloride to form the substituted 10-chlorophenoxarsine having the formula

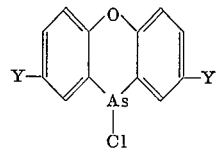

The substituted 10-chlorophenoxarsine compound is then reacted with ammonium hydroxide in ethanol or potassium carbonate or sodium hydroxide in water or in dimethylformamide. The resulting substituted 10,10'-oxybisphenoxarsine type compound having the formula

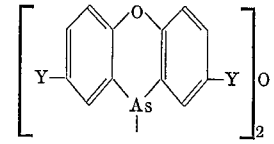

is isolated by conventional procedures.

The 2-phenylenediamine compounds having the formula

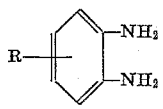

are prepared in accordance with known procedures. In representative procedures substituted dinitrobenzene compound having the formula

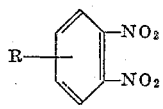

or substituted o-nitroaniline compounds corresponding to the formula

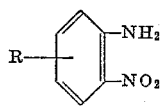

are reacted with Zn and HCl or ZnCl and sulfuric acid to reduce the nitro moiety to the amine moiety. Following the reaction the 2-phenylenediamine compound is collected by conventional procedures.

The o-aminophenol compounds herein employed as starting materials are also prepared in accordance with known procedures. In such procedures a substituted o-nitrophenol corresponding to the formula

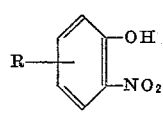

is reacted with Zn and HCl; $ZnCl_2$ and HCl or $Na_2S_2O_4$, NaOH and water. The desired products are isolated by conventional procedures.

What is claimed is:
1. The compound corresponding to the formula

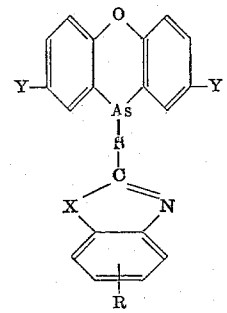

wherein each Y represents a member of the group consisting of chloro, hydrogen and methyl; X represents a member of the group consisting of oxygen, imino and sulfur; and R represents a member of the group consisting of halo, alkyl, alkoxy, phenylmonohalophenyl, monoalkylphenyl and monoalkoxyphenyl, in which halo represents a member of the group consisting of chlorine, bromine and fluorine, and in which alkyl and alkoxy represent an alkyl or alkoxy group containing from 1 to 4 carbon atoms, inclusive.
2. 10-(2-benzoxazolylthio)phenoxarsine.
3. 10-(2-benzothiazolylthio)phenoxarsine.
4. 10-(2-benzimidazolylthio)phenoxarsine.
5. 10-(5-chloro-2-benzimidazolylthio)-phenoxarsine.
6. 10-(6-methyl-2-benzoxazolylthio)-phenoxarsine.

No references cited.

ALEX MAZEL, *Primary Examiner.*
HENRY R. JILES, *Examiner.*
ALTON D. ROLLINS, *Assistant Examiner.*